(12) United States Patent
Barthel et al.

(10) Patent No.: US 6,374,335 B1
(45) Date of Patent: Apr. 16, 2002

(54) DATA LOADING PROCESS

(75) Inventors: Herbert Barthel, Herzogenaurach; Heiner Fuchs; Alfons Göbel, both of Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/202,174

(22) PCT Filed: Jun. 3, 1997

(86) PCT No.: PCT/DE97/01110

§ 371 Date: Dec. 9, 1998

§ 102(e) Date: Dec. 9, 1998

(87) PCT Pub. No.: WO97/49032

PCT Pub. Date: Dec. 24, 1997

(30) Foreign Application Priority Data

Jun. 18, 1996 (DE) .......................................... 196 24 302

(51) Int. Cl.[7] .............................................. G06F 12/00
(52) U.S. Cl. ........................ 711/162; 711/161; 707/204; 714/6
(58) Field of Search ................................ 711/161, 162; 714/5, 6; 707/204

(56) References Cited

U.S. PATENT DOCUMENTS

| | | |
|---|---|---|
| 5,241,670 A | 8/1993 | Eastridge et al. |
| 5,448,718 A | 9/1995 | Cohn et al. |
| 5,548,711 A * | 8/1996 | Brant et al. ..................... 714/5 |
| 5,777,874 A * | 7/1998 | Flood et al. ................. 711/162 |
| 5,857,208 A * | 1/1999 | Ofek .......................... 707/204 |

FOREIGN PATENT DOCUMENTS

| | | |
|---|---|---|
| EP | 566 967 | 10/1993 |
| EP | 636 956 | 2/1995 |
| WO | WO 92/18931 | 10/1992 |

* cited by examiner

Primary Examiner—Do Hyun Yoo
Assistant Examiner—Nasser Moazzami
(74) Attorney, Agent, or Firm—Staas & Halsey LLP

(57) ABSTRACT

Updating method for coupling a supplementary automation system (AGS) to an overall automation system (AGS) having a basic system and transferring the contents of the main memory area (BAS) of the basic system (BAS) by section-by-section readout and writing to the main memory area (ZAS) of the supplementary system (ZAS), with the same data being written to a buffer memory area both when data is read section-by-section from the main memory area of the basic system and when data is written from and to the main memory area of the basic automation system and being transferred from the buffer memory area to the main memory of the supplementary system.

8 Claims, 1 Drawing Sheet

DATA LOADING PROCESS

FIELD OF THE INVENTION

The present invention concerns an updating method for coupling a supplementary automation system to an overall automation system which has a basic automation system and controls an industrial process without interruption. Each automation system has access to its own main storage area and can exchange information with the others and with the industrial operation via communication means.

BACKGROUND INFORMATION

Conventional redundant automation systems are widely used. In most cases, the automation systems are designed with single or double redundancy, i.e., two to three automation system are used to control one and the same industrial operation or industrial plant. With such a configuration, one of the automation systems, hereinafter referred to as the supplementary automation system, may fail, and then the industrial plant is controlled by the remaining automation system(s), the basic automation system or the remaining automation systems.

Updating in coupling a supplementary automation system to an overall automation system formed by at least one automation system is thus necessary, for example, when one of the automation systems has been shut down temporarily due to maintenance work and then started up again after conclusion of the maintenance work. When the automation system that has been shut down temporarily is coupled, it is relevant in particular that the supplementary automation system to be coupled receives the data inventory of the basic automation system. This procedure is known as updating.

Thus, an object of the updating method is to transfer the contents of the main memory area of a basic automation system to a supplementary automation system. European Patent No. 636 956 describes an updating method where data configurations of non-time-critical states and the respective periods of time during which responses to changes in state of the industrial operation are non-time-critical are preset in the basic automation system. Updating is triggered when the duration of the non-time-critical state exceeds the duration required for updating.

If there is insufficient non-time-critical state, updating is performed according to the method described in European Patent No. 636 956 within time slices inserted cyclically into the program processing. The actual updating takes place by reading out of the main memory area of the basic automation system section by section and writing to the main memory area of the supplementary automation system.

Reading out data section by section is also time consuming. Specifically for the case when a time-critical operation is controlled by the basic automation system whose data must be read out, it should be taken into account that the basic controlling automation system cannot monitor the operation during readout and thus may not be able to react promptly to changes in state of the operation. Often, even such a short-term "monitoring gap" is intolerable in controlling the industrial operation.

SUMMARY OF THE INVENTION

An object of the present invention is to provide an updating method for coupling a supplementary automation system to an overall automation system which has a basic automation system and controls an industrial operation without interruption, with the method being executable without any negative effect on the control of the industrial operation.

Due to the given boundary conditions in the industrial operation to be controlled, it is impossible to transfer the contents of the main memory area of the basic automation system in one step to the supplementary automation system to be coupled. Therefore, the updating is divided into two runs.

In a first run, the contents of the main memory area of the basic automation system are transferred by successive readout from the main memory area of the basic automation system and input into the main memory area of the supplementary automation system. The volume of data read out or written in one step is determined by the length of time required for this procedure and the maximum tolerable latency phase of the basic automation system with respect to the industrial operation to be controlled.

If, in section by section readout of data from the main memory area of the basic automation system, the same data is written in a buffer storage area, then the basic automation system can resume control of the technical operation again to advantage while data is being transferred from the buffer storage area to the supplementary automation system. The time during which the basic automation system cannot monitor the industrial operation is thus shortened by using the buffer storage area.

The more powerful the communication means over which data is transferred from the main storage area of the basic automation system into the buffer storage area, the shorter the period of time during which the basic automation system cannot monitor the industrial operation.

A similarly positive effect is achieved by using powerful memory, optimized for the given application—e.g., a static RAM, or static RAM as a dual-port RAM—for the buffer memory area.

After a certain number of reading and writing operations as described above, the "basic data inventory" of the basic automation system has been successfully transferred to the supplementary automation system. During this period of time, however, data in the main memory area of the basic automation system is subjected to continuous changes due to the uninterrupted control of the industrial operation, because counts and timer values, for example, as well as output signals also change. Before the updating can be regarded as concluded, the identity of the data must be guaranteed.

The changes occurring meanwhile in the basic automation system must be transferred in at least one additional subsequent updating run.

To do so, in writing new and/or revised data into the main memory area of the basic automation system, the same data is also written to the buffer memory area together with position information. The contents of the buffer memory area are transferred to the supplementary automation system, and the data transferred is written to the main memory area of the supplementary automation system with analysis of the position information.

The position information includes information on the position of the revised data in the main memory area of the basic automation system and also at least information about the data volume. This position information is then analyzed in entering in the main memory area of the supplementary automation system so that data transferred will occupy the same position in the main memory area of the supplementary automation system as did the original data in the main memory area of the basic automation system.

This position information is absolutely necessary only in transmitting new and/or revised values during the minimum of one additional updating run. In section-by-section readout of data from the main memory area of the basic automation system and in writing this data to the buffer memory area, the position information is not necessary under the condition that it is stipulated that the readout data will always occupy the same area in the buffer memory area, and the area of the buffer memory area thus occupied is transferred to the supplementary automation system before being overwritten in renewed section-by-section readout of data from the main memory area of the basic automation system. In such a procedure, position information is present more or less implicitly. The updating method logs the number of sections read out of the main memory area of the basic automation system and writes the next section on the basis of this information. In addition, the supplementary automation system logs the number of sections already written when data is entered into this system, so that it is always the next section that is updated.

DETAILED DESCRIPTION OF THE INVENTION

Figure 1:
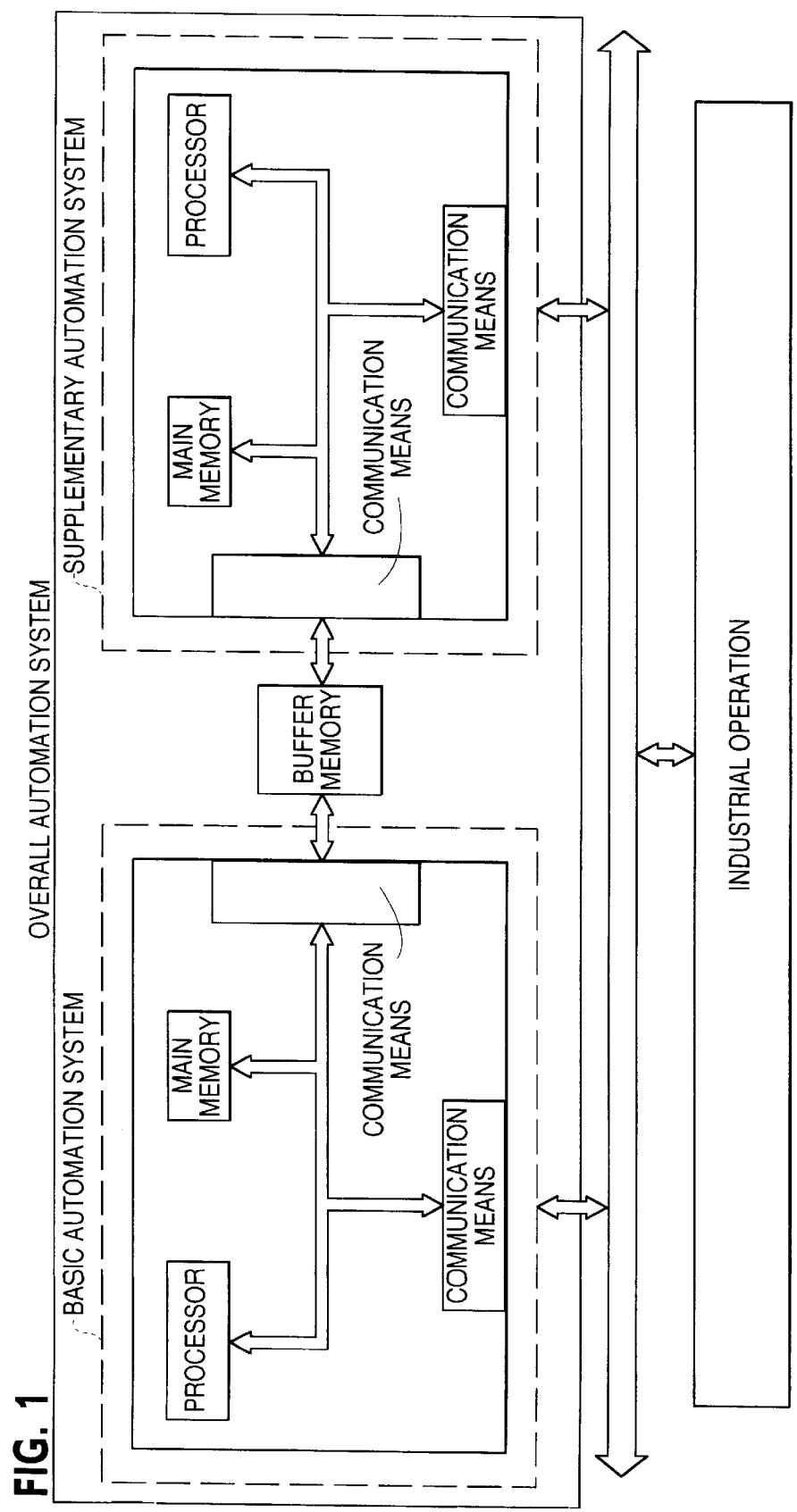
FIG. 1 shows an exemplary embodiment of an automation system according to the present invention.

According to FIG. 1, an industrial operation TP indicated only schematically—is controlled by an overall automation system AGS. Overall automation system AGS has at least one basic automation system BAS and at least one supplementary automation system ZAS. Basic automation system BAS is referred to below simply as basic system BAS, and supplementary automation system ZAS is referred to as supplementary system ZAS.

To control industrial operation TP, automation systems BAS, ZAS have a processor P which runs a program stored in main memory area HSB to control industrial operation TP. In addition, at least process data representing the present status of the industrial operation controlled are stored in main memory area HSB. Furthermore, automation systems BAS, ZAS have communication means KM for communicating with the industrial operation TP and for communication with other automation systems BAS, ZAS of overall automation system AGS. Basic system BAS and supplementary system ZAS are essentially identical in design.

It is assumed in the present case that basic system BAS controls industrial operation TP exclusively and that supplementary system ZAS is to be coupled to basic system BAS to directly assume control of industrial operation TP in the event of failure of basic system BAS. To do so, not only must the program in main memory area HSB of basic system BAS be identical to the program in main memory area HSB of supplementary system ZAS, but also the process information stored in main memory areas HSB of automation systems BAS, ZAS must be the same.

Of course, supplementary system ZAS must be neither executing the program nor perform writing access to peripherals during the updating. However, joint execution of reading access to peripherals is actually advantageous in that it implicitly updates supplementary system ZAS.

The contents of main memory area HSB of basic system BAS are transferred to supplementary system ZAS by reading out the contents and writing them section by section to main memory area HSB of supplementary system ZAS. In section-by-section readout of data from main memory area HSB of basic system BAS, the same data is written to a buffer memory area ZSB. When writing data, in particular when writing new and/or revised data to main memory area HSB of basic system BAS, the same data is also written to buffer memory area ZSB together with position information. The contents of buffer memory area ZSB are transferred to supplementary system ZAS. The transfer takes place either by active reading of supplementary system ZAS or by active writing initiated by instance BAS, ZAS controlling buffer memory area ZSB, with data transferred from buffer memory area ZSB to supplementary system ZAS being written to main memory are HSB of supplementary system ZAS. For the case when data transferred from buffer memory area ZSB to supplementary system ZAS, the data is allocated with position information; this data is analyzed for writing to main memory area HSB of supplementary system ZAS.

In an advantageous embodiment of the updating method, position information is also assigned to data written to buffer memory area ZSB in section-by-section readout from main memory area HSB of basic system BAS. In this way, transfer of data from main memory area HSB of basic system BAS to buffer memory area ZSB is completely uncoupled from transfer of data from buffer memory area ZSB to main memory area HSB of supplementary system ZAS.

In transferring data from main memory area HSB of basic system BAS to buffer memory area ZSB, data is written to buffer memory area ZSB at predetermined times. In this way it is possible for data to be written at times which are especially suitable for transferring data, so that monitoring of industrial operation TP to be controlled is impaired as little as possible. These times which are especially suitable may be, for example, equidistant times or times based on a particular state—a range/section marked explicitly as interruptible, the absence of critical operations within a certain range/section, etc.—of the program executed to control industrial operation TP.

Updating takes place especially quickly and reliably if the data additionally written to buffer memory area ZSB in entering data into main memory area HSB is transferred immediately to supplementary system ZAS. Even with this immediate transfer, the separation of the transfer operations from main memory area HSB of basic system BAS to buffer memory area ZSB and from buffer memory area ZSB to main memory area HSB of supplementary system ZAS is maintained.

Because of the uninterrupted control of industrial operation TP by basic system BAS, the data inventory of basic system BAS is undergoing constant changes. These changes may also occur in areas already transferred to supplementary system ZAS by section-by-section readout and writing to supplementary system ZAS. For this reason, a specially adapted updating method must also be used for transferring new and/or revised data. Therefore, main memory areas HSB of basic and supplementary systems BAS, ZAS and buffer memory area ZSB are divided into segments.

When writing data to main memory area HSB of basic system BAS, the contents of the segment to which writing access was performed at the time of writing are read out. The contents of the entire segment are then written to buffer memory area ZSB together with position information. Just as before, the position information contains information on the position in main memory area HSB of basic system BAS and also at least information about the data volume, i.e., in this case information about the size of the segment.

The contents of the entire segment are transferred from buffer memory area ZSB to supplementary system ZAS and written to main memory area HSB of supplementary system ZAS with analysis of the position information. In this way, the changes occurring during the section-by-section updating can be rapidly and reliably transferred to supplementary system ZAS. For the case when new and/or revised data is obtained in one and the same segment of main memory area HSB of basic system BAS, all the revised data of this segment can be transferred to buffer memory area ZSB in a single transfer operation. This ensures that each revised byte of information is not transferred individually, but instead a complete data structure which is located entirely in this segment can be transferred.

To be able to monitor the changes occurring during updating in main memory area HSB of basic system BAS, status information is assigned to each segment of the main memory area at least of basic system BAS. At the start of the updating method, all status information is set at a value indicating that the data of the respective system has not yet been transferred to supplementary system ZAS. As soon as the data of one segment has been transferred to supplementary system ZAS, the status information of the respective segment is set at a value indicating that the data of the respective segment has been transferred to supplementary system ZAS. If new and/or revised data is written to a segment, the status information of the respective segment is set at a value indicating that the data of the respective segment has not yet been transferred to supplementary system ZAS. The status information is analyzed so that the only data transferred to supplementary system ZAS is data of segments whose status information indicates that data of the respective segment has not yet been transferred to supplementary system ZAS. It is thus possible to transfer the changes selectively in the case of new and/or revised data in main memory area HSB of basic system BAS.

In a first updating run, data of all segments of main memory area HSB of basic system BAS is first transferred to supplementary system ZAS in a certain sequence. Then in at least one additional updating run, only data of segments of main memory area HSB of basic system BAS whose status information indicates that data of the respective segment has not yet been transferred to supplementary system ZAS is transferred to supplementary system ZAS.

To control industrial operation TP, basic system BAS executes a control program stored in main memory area HSB. As is generally conventional in controlling industrial operations TP, this program is subdivided into individual functions or tasks, each of which is assigned a certain priority. Tasks with which important and/or time-critical functions are monitored have a high priority, while other tasks whose execution is of subordinate importance for controlling industrial operation TP, such as displaying the time of day, have a low priority. If the execution of certain tasks is deferred temporarily, the time previously needed to execute these tasks is then available for other tasks, such as updating.

Thus, in an advantageous embodiment, the updating method can be executed especially rapidly and efficiently if tasks with a priority below a first priority limit are deferred after the first updating run and if tasks with any priority are executed again after conclusion of the updating method. After the first updating run, the basic data inventory of basic system BAS is transferred to supplementary system ZAS using section-by-section readout from the main memory area of basic system BAS and writing to main memory area HSB of supplementary system ZAS.

Following execution of the updating method, thus only the changes occurring during this first updating run are to be transferred. If tasks with a priority below a first priority limit are now deferred, the time which was previously required to execute the tasks with a priority below the first priority limit is now also available for transferring changes.

Therefore, a great many revised segments can be transferred in a single additional updating run. Updating is always completed very rapidly when the number of segments transferred in each individual updating run is smaller than the number of newly added, revised segments. To be able to guarantee this reliably, the priority limit may be preselectable, so that even the final user, for example, can define the first priority limit.

The updating method is completed even more rapidly if tasks with a priority below a next-higher priority limit are deferred after each additional updating run and/or after a fixed number of additional updating runs. Thus, in additional updating runs, the time available for updating increases, so that an increasing number of segments can be transferred. Finally, due to the continued deferment of tasks, there is less and less new and/or revised data in main memory area HSB of basic system BAS, so that not only does the number of segments transferred increase, but also the number of segments to be transferred due to the changes that have occurred in the meantime decreases.

Updating is considered as executed when both the first updating run, when data of all segments of main memory area HSB of basic system BAS is transferred to supplementary system ZAS in a certain sequence, and the minimum or one additional updating run, when the only data transferred to supplementary system ZAS is data of segments of main memory area HSB of basic system BAS whose status information indicates that data of the respective segment is yet to be transferred to supplementary system ZAS, are completed.

The minimum of one additional updating run is in turn completed when all status information of the segments of main memory area HSB of basic system BAS indicates that the data of the respective segment has already been transferred to supplementary system ZAS.

If updating is considered as executed, a test quantity may be determined additionally in some cases—to increase reliability—in both automation systems BAS, ZAS on the basis of the data already updated or yet to be updated. The test quantity may be, for example, a test sum or a signature. The test quantities determined are exchanged and compared over communication means KM. If the test quantities are identical, the updating is considered as concluded without error; otherwise all or part of the updating method is repeated. To permit partial repetition of updating in the case of error, the test quantity may be constructed so that a suitable interpretation makes it possible to determine for which data the updating method is to be repeated in part.

This updating can be implemented by an overall automation system AGS which has a buffer memory area ZSB and executes the updating method described here. In an advantageous embodiment—in deviation from the diagram in FIG. 1—one of automation systems BAS, ZAS of such an overall automation system AGS has buffer memory area ZSB. Automation system BAS, ZAS may be either basic automation system BAS or supplementary automation system ZAS.

What is claimed is:

1. An updating method for coupling a supplementary automation system to an overall automation system, the supplementary automation system including a first memory, comprising:

controlling by the overall automation system and without interruption, an industrial operation, the overall automation system including a basic automation system, the basic automation system including a second memory;

continuously modifying contents of the second memory as a function of the uninterrupted control of the industrial operation;

reading first data section-by-section from the second memory;

when the first data is read from the second memory, writing the first data to a buffer memory;

writing second data to the second memory;

when the second data is written to the second memory, writing the second data and position information to the buffer memory, and transferring contents of the second memory to the supplementary automation system via a communication arrangement, wherein the first memory and the second memory are divided into segments, wherein the writing second data to the second memory includes writing the second data to a first segment of the second memory segments, and wherein the transferring includes transferring entire contents of the first segment of the second memory to the supplementary automation system, and wherein the transferred entire contents of the first segment of the second memory is written to the first memory.

2. The updating method according to claim 1, further comprising the steps of:

assigning respective status information to each respective segment of the second memory segments;

at a start of the updating method, setting each respective status information to a value indicating that data of the respective segment has not yet been transferred to the supplementary automation system;

for each respective segment, when data of the respective segment is transferred to the supplementary automation system, setting the respective status information to a value indicating that the data of the respective segment has been transferred to the supplementary automation system;

for each respective segment, when data of the respective segment is one of new and revised, setting the respective status information to a value indicating that the data of the respective segment is yet to be transferred to the supplementary automation system; and transferring data from at least one respective segment to the supplementary automation system only if the respective status information of the at least one respective status is of the value indicating that the data of the respective segment is yet to be transferred.

3. The updating method according to claim 2, further comprising the steps of:

in a first updating run, transferring data of all segments of the second memory to the supplementary automation system in a predetermined sequence; and in at least one additional updating run, transferring data from at least one respective segment of the second memory to the supplementary automation system only if the respective status information of the at least one respective segment is of the value indicating that the data of the respective segment is yet to be transferred.

4. The updating method according to claim 3, further comprising the steps of:

executing tasks by the basic automation system to control the industrial operation, each of the tasks having a predetermined priority;

after the first updating run, deferring the tasks having a priority below a first priority limit; and after conclusion of the updating method, executing the tasks having any priority.

5. The updating method according to claim 3, wherein after each of the at least one additional updating run, deferring the tasks having the priority below a next higher priority limit.

6. An updating method for coupling a supplementary automation system to an overall automation system, the supplementary automation system including a first memory, comprising:

controlling by the overall automation system and without interruption, an industrial operation, the overall automation system including a basic automation system, the basic automation system including a second memory;

continuously modifying contents of the second memory as a function of the uninterrupted control of the industrial operation;

reading first data section-by-section from the second memory;

when the first data is read from the second memory, writing the first data to a buffer memory;

writing second data to the second memory;

when the second data is written to the second memory, writing the second data and position information to the buffer memory, and transferring contents of the second memory to the supplementary automation system via a communication arrangement, wherein the first memory and the second memory are divided into segments, wherein the writing second data to the second memory includes writing the second data to a first segment of the second memory segments, wherein the transferring includes transferring entire contents of the first segment of the second memory to the supplementary automation system, and wherein the transferred entire contents of the first segment of the second memory is written to the first memory with analysis of the position information.

7. An overall automation system for uninterrupted control of an industrial operation, comprising:

a buffer memory;

a basic automation system including a first memory storing at least one of first data and first machine commands, the first memory being continuously updated as a function of the uninterrupted control of the industrial operation, wherein when the at least one of the first data and the first machine commands is read section-by-section from the first memory, the at least one of the first data and the first machine commands is written to the buffer memory, and when the at least one of the first data and first machine commands is written to the first memory, the at least one of the first data and first machine commands is written to the buffer memory;

a supplementary automation system including a second memory storing at least one of second data and second machine commands, contents of at least one of the first memory and the buffer being transferred to the second memory by section-by-section readout and writing, wherein contents of the buffer are optionally written to the second memory with analysis of position information;

a processor executing at least one of the first machine commands and the second machine commands and controlling the industrial operation;

a first communication arrangement for providing communication to the industrial operating;

a second communication arrangement for providing communication to the basic automation system and the supplementary automation system; and a bus coupling the first communication arrangement, the second communication arrangement, the processor, the first memory, and the second memory, wherein the first memory, the second memory, and the buffer are divided into segments, wherein the at least one of the first data and the first machine commands is written to a selected segment of the first memory segments, contents of the entire selected segment being written to the buffer memory with the position information, the transferred contents of the entire selected segment being written to the second memory from the buffer memory with analysis of the position information.

8. The overall automation system according to claim 7, wherein each of the segments of the first memory and the second memory is assigned status information.

* * * * *